3,157,571
PESTICIDES FOR THE PROTECTION OF
USEFUL FISHES
Otto Scherer, Heinz Frensch, and Gerhard Stähler, all of Frankfurt am Main, Germany, assignors to Farbwerke Hoechst Aktiengesellschaft vormals Meister Lucius & Brüning, Frankfurt am Main, Germany, a corporation of Germany
No Drawing. Filed Feb. 10, 1958, Ser. No. 714,028
Claims priority, application Germany, Nov. 6, 1957, F 24,339
10 Claims. (Cl. 167—31)

Every year fish breeders suffer great losses caused by animal parasites on fishes. During the last decades the infection of fresh waters by these parasites has become very extensive. It is known that especially the rapid increase of the crab *Eriocheir sinensis* seriously endangers the stocks of useful fishes by destroying the spawn. Another parasite, belonging to the family of the lampreys, i.e., the sea-lamprey, has overcrowded the large Canadian and American lakes to such an extent that the useful fishes, in particular the lake-trout, have considerably diminished.

In the control of said parasites a certain success was reached by installing electric screens. Their high cost and the seasonable variations of efficiency of these electric screens do, however, not justify their installation on a large scale. Therefore, attempts have been made to find chemical agents which, while protecting the useful fishes, allow of combating the lower organized parasites.

It was found that special halogenated and/or nitrated phenols of a certain constitution may be used for the above-mentioned objectives. These compounds, however, are of a high toxicity to warm-blooded animals, whereby their transport and application, often under primitive conditions, are rendered difficult. Since in general a local control of the parasites is not possible, the tributary streams used by the parasites when entering the fishery waters are treated with the pesticidal agents.

For this purpose the agent should be water-soluble, possibly without leaving any residue, and capable of being rapidly distributed. In view of the above cited difficulties the compound should be supplied in a formulation which, on the one hand, shows the highest possible concentration of the stock solution and which, on the other hand, is relatively independent of meteorological conditions. In spite of its high concentration the product should not crystallize under the influence of varying temperatures.

One of the compounds particularly suitable for controlling lampreys is 3-trifluoro-methyl-4-nitrophenol. It is of excellent efficiency in destroying 90–100% the sea-lampreys when applied in a concentration between 2 and 12 parts per million (p.p.m.), only causing a maximum rate of mortality of 10% of the useful fishes. The compound is very independent of temperature conditions, as regards its efficiency, which particularly distinguishes it from other phenols entering into consideration. As a free phenol, however, the compound shows unfavorable toxic properties since it is very toxic not only when taken orally, but likewise when it is absorbed by the skin which occurs very easily.

Now, we have found that for the control of animal parasites on fishes there are suitable aqueous solutions containing 40–60% by weight of a water-soluble salt of 3-trifluoro-methyl-4-nitrophenol and 10–20 percent by weight of an organic solubilizer miscible with water and showing a strong dipole force, the rest being water. Such solubilizers are, for example, amides of organic acids and their alkylation products such as formamide, mono-methyl-formamide, dimethyl-formamide, furthermore dimethyl-sulfoxide. These agents used according to the invention yield stock solutions of high concentration and guarantee considerable safety for the applier together with good action, for instance on sea lampreys. Surprisingly it was found that preferably solutions of alkali metal salts and ammonium salts of 3-trifluoro-methyl-4-nitro-phenol, the salts of mono-, di- and tri-ethanolamine or an alkylamine salt with simultaneous use of dimethyl-formamide or dimethyl-sulfoxide as organic solubilizers show a surprisingly low toxicity to warm-blooded animals.

An agent consisting of 50% of the sodium salt of 3-trifluoro-methyl-4-nitrophenol, 30% of water and 20% of dimethyl-formamide as solubilizer shows, calculated on the active substance, and LD 50 of 300 milligrams per kilogram of rat (orally), and an agent consisting of 51% of 3-trifluoro-methyl-4-nitrophenol, 24.5% of ethanolamine and 24.5% of dimethyl-formamide shows an LD 50 of 200 milligrams, likewise calculated on the active substance.

In contradistinction thereto, the LD 50 of pure 3-trifluoro-methyl-4-nitrophenol amounts to about 30 milligrams per kilogram of rat.

This surprising result is of high importance for the practical use of the substance.

The afore-mentioned combinations are only two of many possibilities. The type of salt and of solubilizer may vary. As salts there enter into consideration preferably such types as are readily soluble in water.

In the following there are given some data concerning efficiency and possibilities of use of the formulations claimed.

If 3–7.5 mg./liter of water of the formulation consisting of 50.0% of the sodium salt of 3-trifluoro-methyl-4-nitrophenol,
30.0% of water,
20.0% of dimethyl-formamide are introduced into fishery waters with edible fishes, such as eels, carps, trouts and welses and containing undesired lower aquatic organisms such as leeches (Hemiclepsis spec., Glossisiphonia spec., Tubicifides) and similar animals, leeches are immediately caused to curl, the sucking organs are loosened from the supports, the body is decolourized and, finally, the leeches die. It is surprising that, while the undesired, lower animals are destroyed, the fishes mentioned above are not affected. Only concentrations of 15–18 milligrams of the formulation per liter of water likewise destroy the useful fishes.

The lampreys which are rather closely related with the above-mentioned fishes can likewise be destroyed, while the useful fishes are spared. Only when applying the substance in a 6–8 times higher concentration, trouts and other useful fishes are likewise killed.

Furthermore, it is surprising that the animals on which fish feed such as Daphnidae, Coleoptera, Odonata, Notonectidae and Gammaridae are not affected by the concentrations of the above-mentioned preparation necessary for destroying undesired animals such as leeches and lampreys so that they can always serve as food for the fishes.

For destroying the above-mentioned feed animals concentrations of 20–24 milligrams/liter of the above-mentioned compound are needed.

The following examples serve to illustrate the invention but they are not intended to limit it thereto.

*Example 1*

50 grams of the sodium salt of 3-trifluoro-methyl-4-nitrophenol are dissolved in a mixture of 30 grams of water and 20 grams of dimethyl-formamide. The mixture thus obtained remains liquid with cooling down to −10° C. and, when tested orally for toxicity, shows an LD 50 of 600 milligrams per kilogram of rat.

*Example 2*

Into a mixture of 45 grams of 3-trifluoro-methyl-4-nitrophenol and 20 grams of dimethyl-formamide there is introduced a solution of 8.7 grams of sodium hydroxide in 26 ml. of water. A product is obtained showing the properties of that indicated in Example 1.

*Example 3*

The same manner of operation is applied as described in Example 2, the sodium hydroxide, however, being replaced by 12.2 grams of potassium hydroxide. The mixture thus obtained shows the same properties as that indicated in Examples 1 and 2.

*Example 4*

Into a mixture of 42 grams of 3-trifluoro-methyl-4-nitrophenol and 20 grams of dimethyl-formamide there are introduced, while stirring, 28 grams of ammonia solution of 10% strength. The mixture thus obtained shows the same properties as that indicated in Examples 1 to 3.

*Example 5*

After mixing of 42 grams of 3-trifluoro-methyl-4-nitrophenol with 20 grams of dimethyl-formamide, 20 grams of ethanolamide are added thereto. This mixture remains liquid at −10° C. and shows an LD 50 of 400 milligrams per kilogram of rat, i.e., of about 200 milligrams/kilogram of rat referred to the pure active toxicant.

*Example 6*

36 grams of dimethylamine solution of 22% strength are introduced into a mixture consisting of 42 grams of 3-trifluoro-methyl-4-nitrophenol and 20 grams of dimethyl-formamide. This mixture shows the same properties as that indicated in Example 5.

We claim:

1. A composition comprising an aqueous solution containing about 40 to 60% by weight of a water-soluble salt of 3-trifluoro-methyl-4-nitrophenol and about 10 to 20 percent by weight of an organic solubilizer miscible with water and showing a strong dipole force.

2. A composition comprising an aqueous solution containing about 40–60% by weight of a member selected from the group consisting of the alkali metal salts, mono-, di- and triethanolamine salts, alkylamine salts and ammonium salt of 3-trifluoro-methyl-4-nitrophenol and about 10 to 20 percent by weight of an organic solubilizer of the group consisting of dimethyl-formamide and dimethylsulfoxide as water-miscible organic solubilizer.

3. A composition comprising an aqueous solution containing about 50% by weight of sodium 3-trifluoromethyl-4-nitrophenolate and 20% by weight of dimethylformamide.

4. A composition comprising an aqueous solution containing about 50% by weight of potassium 3-trifluoromethyl-4-nitrophenolate and 20% by weight of dimethylformamide.

5. A composition comprising an aqueous solution containing about 50% by weight of ammonium 3-trifluoromethyl-4-nitrophenolate and 20% by weight of dimethylformamide.

6. A composition comprising an aqueous solution containing about 50% by weight of dimethylamine 3-trifluoromethyl-4-nitrophenolate and 20% by weight of dimethylformamide.

7. A method for controlling sea lampreys by adding to a body of water inhabited by said lampreys a composition comprising 3-trifluoromethyl-4-nitrophenol in a water-miscible organic solvent.

8. A method for controlling sea lampreys which comprises adding an aqueous solution of a water-soluble salt of 3-trifluoromethyl-4-nitrophenol to a body of water inhabited by said lampreys.

9. A method for controlling sea lampreys which comprises adding an aqueous solution of a water-soluble salt of 3-trifluoromethyl-4-nitrophenol and a water-miscible organic solubilizer therefor to a body of water inhabited by said lampreys.

10. A method for controlling sea lampreys which comprises adding to a body of water inhabited by said lampreys 3-trifluoromethyl-4-nitrophenol.

References Cited by the Examiner

J. Chem. Soc., pages 2792–2794, 1950.

Scheflan et al.: The Handbook of Solvents, p. 310, 1953.

U.S. Dept. of the Interior Fish and Wildlife Service, Special Scientific Report, Fisheries No. 207, pages 46 and 47, March 1957.

LEWIS GOTTS, *Primary Examiner.*

M. O. WOLK, *Examiner.*